United States Patent
Chaudhry et al.

(10) Patent No.: US 7,418,581 B2
(45) Date of Patent: Aug. 26, 2008

(54) METHOD AND APPARATUS FOR SAMPLING INSTRUCTIONS ON A PROCESSOR THAT SUPPORTS SPECULATIVE EXECUTION

(75) Inventors: Shailender Chaudhry, San Francisco, CA (US); Paul Caprioli, Mountain View, CA (US); Sherman H. Yip, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 186 days.

(21) Appl. No.: 11/405,965

(22) Filed: Apr. 17, 2006

(65) Prior Publication Data

US 2007/0226472 A1 Sep. 27, 2007

Related U.S. Application Data

(60) Provisional application No. 60/785,573, filed on Mar. 23, 2006.

(51) Int. Cl.
*G06F 9/30* (2006.01)
(52) U.S. Cl. ..................................... 712/227
(58) Field of Classification Search .................. 712/227
See application file for complete search history.

(56) References Cited

U.S. PATENT DOCUMENTS 6,574,727 B1 * 6/2003 Davidson et al. ............ 712/227

OTHER PUBLICATIONS

Barnes, Ronald D. et al., "Beating in-order stalls with "flea-flicker" two-pass pipelining", Proceedings of the 36th International Symposium on Microarchitecture, Dec. 3-5, 2003.*

* cited by examiner

*Primary Examiner*—Richard Ellis
(74) *Attorney, Agent, or Firm*—Park, Vaughan & Fleming LLP; Anthony P. Jones

(57) ABSTRACT

One embodiment of the present invention provides a system that samples instructions on a processor that supports speculative-execution. The system starts by selecting an instruction, wherein selecting an instruction involves selecting an instruction that is received from an instruction fetch unit or a deferred queue, wherein the deferred queue holds deferred instructions which are deferred because of an unresolved data dependency. The system then records information about the selected instruction during execution of the selected instruction, whereby the recorded information can be used to determine the performance of the processor.

17 Claims, 3 Drawing Sheets

METHOD AND APPARATUS FOR SAMPLING INSTRUCTIONS ON A PROCESSOR THAT SUPPORTS SPECULATIVE EXECUTION

RELATED APPLICATION

This application hereby claims priority under 35 U.S.C. section 119 to U.S. Provisional Patent Application No. 60/785,573 filed 23 Mar. 2006, entitled "Method-and Apparatus for Sampling Instructions on a Processor the Supports Speculative Execution," by inventors Shailender Chaudhry, Paul Caprioli, and Sherman H. Yip.

BACKGROUND

1. Field of the Invention

The present invention relates to techniques for improving the performance of computer systems. More specifically, the present invention relates to a method and apparatus that facilitates sampling instructions for performance analysis purposes on a processor that supports speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load generates a cache miss, the subsequent access to level-two (L2) cache or memory can require dozens or hundreds of clock cycles to complete, during which time the processor is typically stalled (and therefore idle), performing no useful work.

A number of forms of "speculative execution" have been proposed or are presently used to prevent the processor from stalling when a cache miss occurs. Some processors support "out-of-order execution," in which instructions are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that are available for register renaming purposes during out-of-order execution also limits the effective size of the issue queue.

Some processor designers have proposed generating a checkpoint and entering a "scout mode" during processor stall conditions. In scout mode, instructions are speculatively executed to prefetch future loads, but results are not committed to the architectural state of the processor. For example, see U.S. patent application Ser. No. 10/741,944, filed 19 Dec. 2003, entitled, "Generating Prefetches by Speculatively Executing Code through Hardware Scout Threading," by inventors Shailender Chaudhry and Marc Tremblay. By avoiding the need to re-order instructions that were issued out-of-order, the scout mode technique avoids the need for complex instruction control structures. However, the scout mode technique suffers from the disadvantage of having to re-compute results of computational operations that were performed during scout mode.

To avoid performing some of these re-computations, processor designers have proposed entering an "execute-ahead" mode when the processor encounters a data-dependent stall condition. In execute-ahead mode, the processor defers instructions that cannot be executed because of unresolved data dependencies and executes other non-deferred instructions in program order.

When a data dependency is ultimately resolved, the processor transitions to a "deferred mode" to execute the deferred instructions. In deferred mode, the processor executes deferred instructions that are able to be executed while re-deferring deferred instructions that still cannot be executed because of unresolved data dependencies. For example, see U.S. patent application Ser. No. 10/686,061, filed 14 Oct. 2003, entitled, "Selectively Deferring the Execution of Instructions with Unresolved Data Dependencies as They Are Issued in Program Order," by inventors Shailender Chaudhry and Marc Tremblay.

To achieve good performance, it is desirable to be able to evaluate the performance of processor designs that support the above-described speculative-execution techniques while executing real program code. Unfortunately, it can be difficult to accurately evaluate the performance of such a processor in execute-ahead mode. In a typical performance evaluation system, the processor monitors the behavior of selected instructions in the program code as they execute on the processor. After observing the selected instructions, a designer or a programmer can extrapolate these observations to determine a statistical execution profile for the processor while executing the program code. For example, the observations can be used to determine the average number of cycles required to execute a section of the program code or the average memory latency of the program code by monitoring the execution of a small percentage of the instructions in the program code. This performance evaluation technique has proven to be reasonably accurate because most instructions proceed through the pipeline in a regular way.

However, during execute-ahead mode some of the instructions may spend an unknown number of cycles in the deferred queue, awaiting the resolution of the data dependency before they are able to complete. Consequently, monitoring a small percentage of selected instructions during execute-ahead mode can produce highly variable performance results that are likely to be inaccurate.

When such performance results are inaccurate, the users of the performance results, such as processor designers, programmers, operating systems, or compilers, can use these inaccurate performance results to make design decisions which can lead to sub-optimal system performance.

Hence, what is needed is a technique for evaluating the performance of a processor that supports speculative execution without the above-described problems.

SUMMARY

One embodiment of the present invention provides a system that samples instructions on a processor that supports speculative-execution. The system starts by selecting an instruction, wherein selecting an instruction involves selecting an instruction that is received from an instruction fetch unit or a deferred queue, wherein the deferred queue holds deferred instructions which are deferred because of an unresolved data dependency. The system then records information about the selected instruction during execution of the selected instruction, whereby the recorded information can be used to determine the performance of the processor.

In a variation on this embodiment, the system tags a selected instruction by setting an indicator that moves through the processor along with the instruction. This indicator facilitates recording information during the execution of the selected instruction.

In a further variation, deferred instructions are deferred to the deferred queue during an execute-ahead mode, wherein instructions that could not be executed because of an unresolved data dependency were deferred, and wherein other non-deferred instructions were executed in program order.

In a further variation, deferred instructions are issued from the deferred queue in a deferred mode, wherein deferred instructions that able to be executed are executed in program order, and wherein other deferred instructions that still cannot be executed because of unresolved data dependencies are deferred again.

In a further variation, selecting an instruction involves pseudo-randomly selecting an instruction.

In a further variation deferring an instruction involves removing the tag from the selected instruction.

In a variation of this embodiment, recording the information about the execution of the selected instruction involves recording at least one parameter relating to execution of the selected instruction.

In a variation of this embodiment, the system records information only for instructions of one or more predetermined types.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Processor

Figure 1:
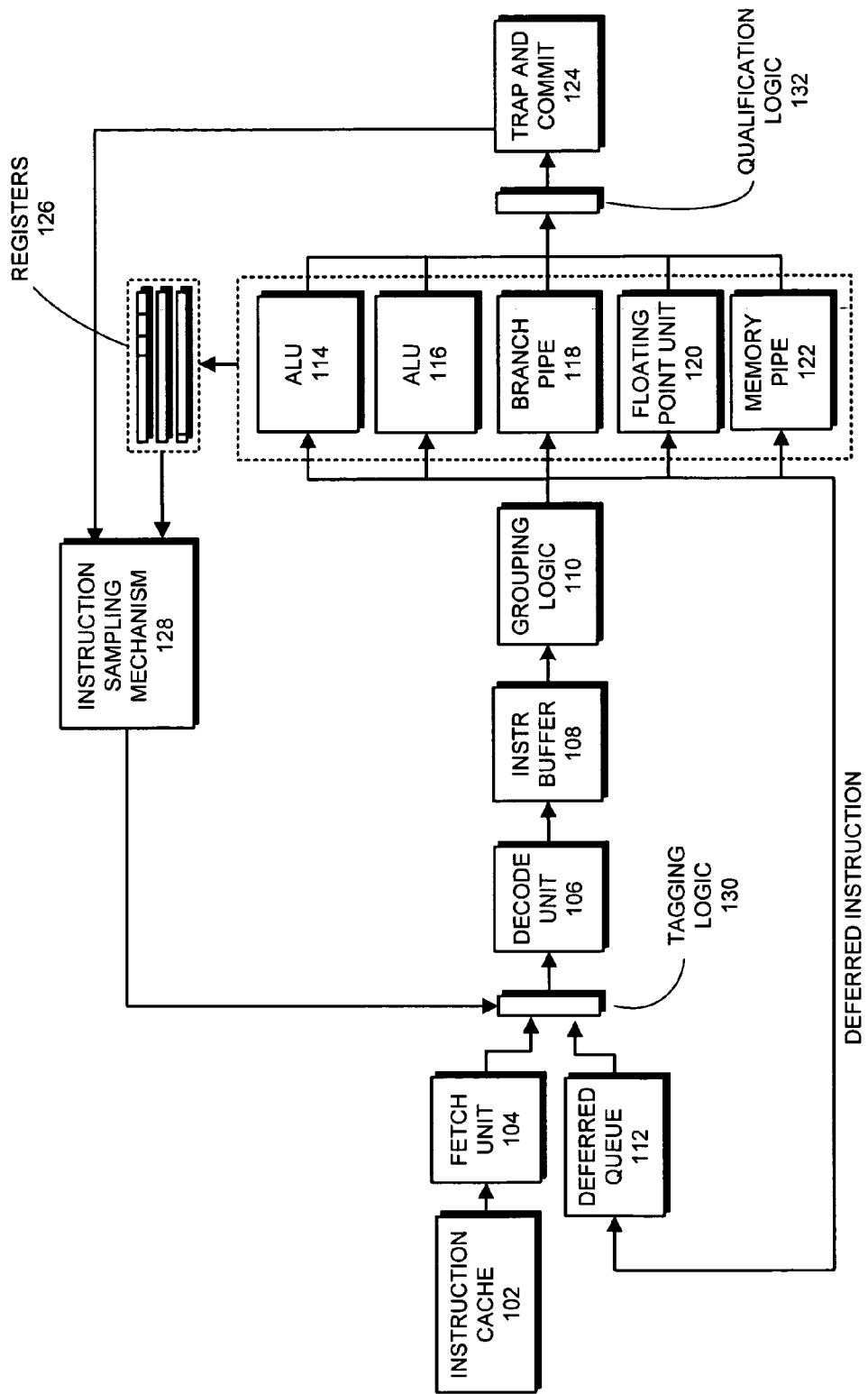
FIG. 1 illustrates the design of a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred queue 112, grouping logic 110, arithmetic logic unit (ALU) 114, ALU 116, branch pipe 118, floating point unit 120, memory pipe 122, and trap and commit unit 124.

Processor 100 also includes an instruction-sampling subsystem. This instruction-sampling subsystem gathers information during the execution of selected instructions. For example, the instruction-sampling subsystem can monitor information such as: the value of the program counter ("PC") when and instruction was fetched; the identity of the strand which executed the instruction; the type, privilege, or trap-level of the instruction; the virtual address or effective address of the instruction; the data returned by the instruction; the front-end or completion latency of the instruction; or other values that indicate the performance of an instruction on the processor. A programmer or compiler can then use the gathered information to determine an execution profile for the selected instruction.

Given execution profiles for several instructions in a section of code, a programmer or compiler can determine an average statistical execution profile for the entire section of code. The programmer or compiler can then modify the code or the execution conditions to optimize processor 100's performance. For example, threads of execution can be moved to different cores on a chip-multiprocessing (CMP) system when one or more threads are conflicting with each other, or a just-in-time (JIT) compiler can re-arrange program code on-the-fly to avoid the conflicts.

The instruction-sampling subsystem illustrated in FIG. 1 includes tagging logic 130, registers 126, qualification logic 132, and instruction-sampling mechanism 128. Tagging logic 130 is the logic that selects the instruction to be sampled by the instruction-sampling subsystem. Tagging logic 130 uses a pseudo-random number generator to initialize a counter. This counter is decremented for each instruction that is fed to tagging logic 130 (from either fetch unit 104 or deferred queue 112). When the counter underflows, tagging logic 130 tags the current instruction.

In one embodiment of the present invention, processor 100 can only sample one instruction at a time. Hence, after tagging an instruction, tagging logic 130 does not tag another instruction until receiving a request to do so from either instruction-sampling mechanism 128 or processor 100.

Registers 126 are used to store the values gathered by processor 100 during the execution of the tagged instruction. Each gathered value is written to the corresponding register as the value becomes available during the execution of the tagged instruction. For example, the value of the PC can be stored as soon as the instruction is tagged, but the data returned by the tagged instruction can only be stored after the tagged instruction generates the return data.

Qualification logic 132 determines whether a tagged instruction qualifies for sampling. If so, qualification logic 132 signals instruction-sampling mechanism 128 to sample the instruction. Otherwise, instruction-sampling mechanism 128 does not sample the instruction. Qualification logic 132 may signal instruction-sampling mechanism 128 to sample only selected types of instructions, such as memory access instructions or integer operation instructions. Alternatively, qualification logic 132 may signal instruction-sampling mechanism 128 to sample all tagged instructions.

If the signaled by qualification logic 132, instruction-sampling mechanism 128 copies the values stored in registers 126 and causes tagging logic 130 pseudo-randomly initialize a countdown towards the next selected instruction, thereby restarting the sampling process. Alternatively, if a tagged instruction does not qualify for sampling, processor 100 can cause tagging logic 130 to restart the sampling process.

In one embodiment of the present invention, instruction-sampling mechanism 128 is implemented in software. For example, the operating system may include a mechanism for monitoring the execution of instructions. In an alternative embodiment, instruction-sampling mechanism 128 is implemented in hardware.

During operation, fetch unit 104 retrieves instructions to be executed from instruction cache 102, and feeds these instructions into tagging logic 130. As the instructions pass through tagging logic 130, tagging logic 130 pseudo-randomly selects an instruction and tags it. After tagging the instruction, processor 100 gathers information about the execution of the tagged instruction as the instruction proceeds through the pipeline. From tagging logic 130, the instructions feed to decode unit 106.

Next, decode unit 106 forwards the instructions to instruction buffer 108, which is organized as a FIFO buffer. Instruction buffer 108 feeds instructions in program order into grouping logic 110, which groups instructions together and sends them to the execution units, which include: memory pipe 122 for accessing main memory), ALU 114, ALU 116, branch pipe 118 (which resolves control transfer computations), and floating point unit 120.

If an instruction cannot be executed due to an unresolved data dependency, such as an operand that has not returned from a load operation, the system defers execution of the instruction and copies the instruction into deferred queue 112. Like instruction buffer 108, deferred queue 112 is organized as a FIFO buffer.

In one embodiment of the present invention, when an instruction is deferred, processor 100 copies the instruction to deferred queue 112, but does not clear the instruction from the pipeline. For this embodiment, the remaining instruction proceeds through the pipeline, but the result is discarded. Consequently, the remaining instruction eventually passes through qualification logic 132. Despite the fact the result is discarded, certain types of information gathered during the execution of the remaining instruction can be sampled. For example, processor 100 may sample information about the instruction type, the number of instruction cache misses, the percentage of instructions that are deferred, or instruction translation lookaside buffer (ITLB) misses for the remaining instruction.

In one embodiment of the present invention, the tag is stripped from each tagged instruction when the tagged instruction is deferred. The tag is stripped at this point because the instruction may remain in the deferred queue for an extended time, which prevents the processor from tagging (and therefore monitoring) other instructions. In an alternative embodiment, the instruction retains the tag while in the deferred queue. This facilitates gathering additional performance data from the deferred instruction.

When the data dependency is eventually resolved, instructions from deferred queue 112 are executed in program order with respect to other deferred instructions, but not with respect to other previously executed non-deferred instructions. This process is described in more detail below with reference to FIG. 2.

State Diagram

Figure 2:
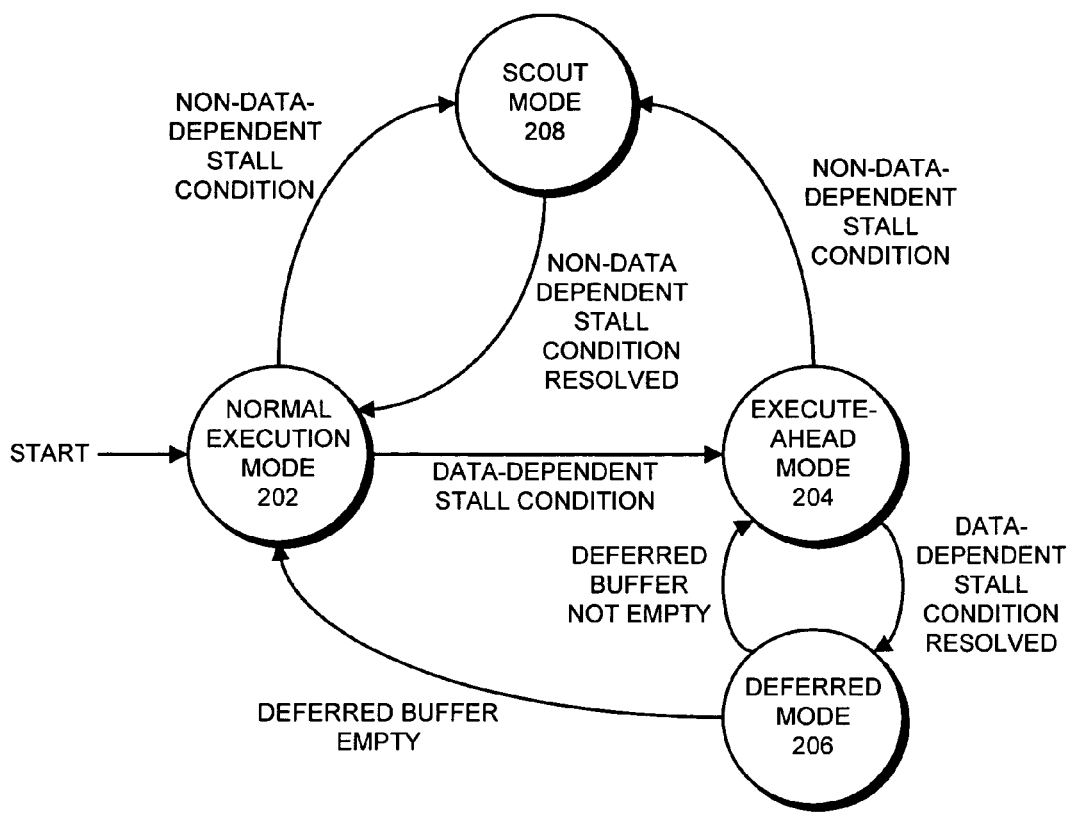
FIG. 2 presents a state diagram which includes execute-ahead mode, deferred mode and the scout mode in accordance with an embodiment of the present invention.

FIG. 2 presents a state diagram which includes execute-ahead mode 204, deferred mode 206, and the scout mode 208 in accordance with an embodiment of the present invention. The system starts in normal-execution mode 202, wherein instructions are executed in program order as they are issued from instruction buffer 108 (see FIG. 1).

Next, if an unresolved data dependency arises during execution of an instruction, the system moves to execute-ahead mode 204. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 204, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 204 or deferred mode 206.) The system also "defers" execution of the instruction that encountered the unresolved data dependency by copying the instruction to deferred queue 112.

While operating in execute-ahead mode 204, the system continues to execute instructions in program order as they are received from instruction buffer 108. During this process, instructions that cannot execute because of an unresolved data dependency are deferred into deferred queue 112.

During execute-ahead mode 204, if an unresolved data dependency is finally resolved, the system moves into deferred mode 206, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by copying these "again-deferred" instructions back into deferred queue 112. On the other hand, the system executes other instructions that can be executed in program order with respect to each other.

After the system completes a pass through deferred queue 112, if deferred queue 112 is empty, the system moves back into normal-execution mode 202. This may involve committing changes made during execute-ahead mode 204 and deferred mode 206 to the architectural state of processor 100, if such changes have not been already committed. This may also involve discarding the checkpoint generated when the system moved into execute-ahead mode 204.

On the other hand, if deferred queue 112 is not empty after the system completes a pass through deferred queue 112, the system returns to execute-ahead mode 204 to execute instructions from instruction buffer 108 from the point where the execute-ahead mode 204 left off.

If a non-data dependent stall condition arises while the system is in normal-execution mode 202 or in execute-ahead mode 204, the system moves into scout mode 208. (This non-data-dependent stall condition can include a memory barrier operation, or a deferred queue full condition.) In scout mode 208, instructions are speculatively executed to prefetch future memory operations, but results are not committed to the architectural state of processor 100.

Scout mode 208 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 208.

Unfortunately, computational operations performed during scout mode 208 need to be recomputed again, which can require a large amount of computational work.

When the original "launch point" stall condition is finally resolved, the system moves back into normal-execution mode 202, and, in doing so, uses the previously generated checkpoint to resume execution from the launch point instruction that encountered the launch point stall condition. The "launch point" stall condition is the stall condition that originally caused the system to move out of normal-execution mode 202. For example, the launch point stall condition can be the data-dependent stall condition that caused the system to move from normal-execution mode 202 to execute-ahead mode 204, before moving to scout mode 208. Alternatively, the launch point stall condition can be the non-data-dependent stall condition that caused the system to move directly from normal-execution mode 202 to scout mode 208.

Performance Monitoring Process

Figure 3:
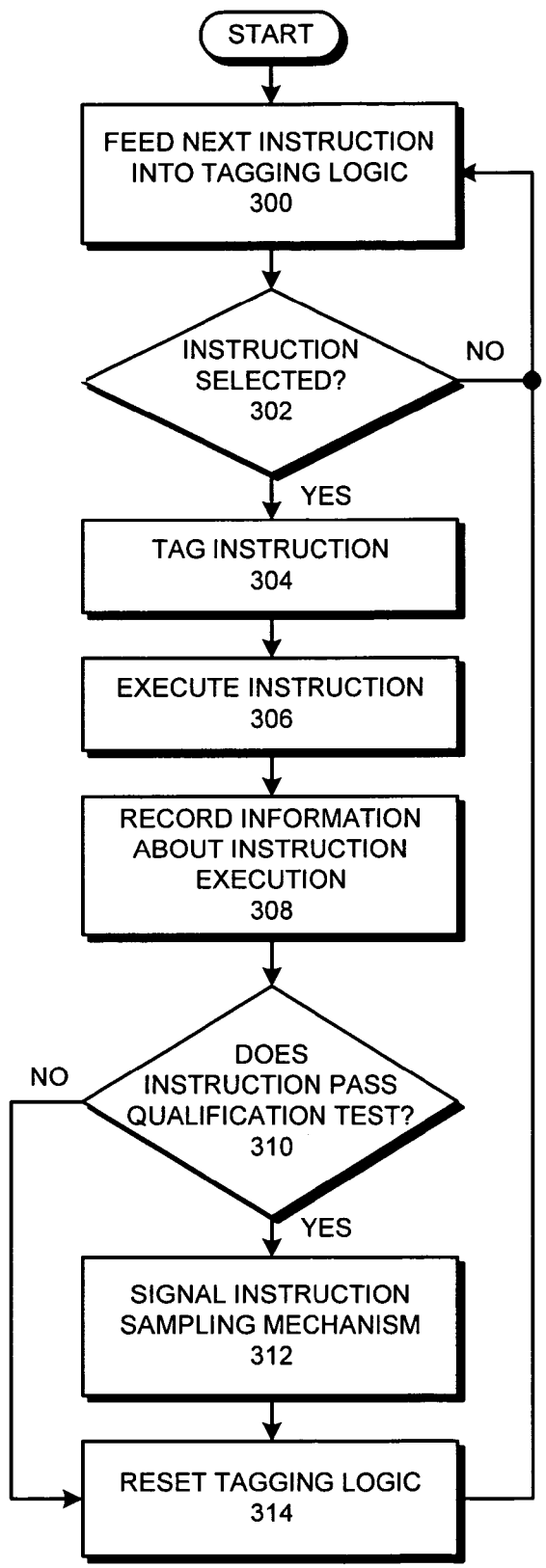
FIG. 3 presents a flowchart illustrating the instruction-sampling process in accordance with an embodiment of the present invention.

FIG. 3 presents a flowchart illustrating the instruction-sampling process in accordance with an embodiment of the present invention. The process starts when fetch unit 104 (see FIG. 1) fetches the next instruction in the program code from instruction cache 102 (or when deferred queue 112 issues the next deferred instruction in deferred mode 206) and feeds the instruction into tagging logic 130 (step 300).

Tagging logic 130 includes a counter which is initialized using a pseudo-random number generator. As each instruction feeds into tagging logic 130, the counter is incremented. When the counter overflows, tagging logic 130 selects the next instruction for sampling. If tagging logic 130 does not select a given instruction (step 302), tagging logic 130 passes the instruction to decode unit 106 to continue execution. Processor 100 then returns to step 300 and feeds the next instruction to tagging logic 130.

If tagging logic 130 does select the instruction (step 302), tagging logic 130 tags the instruction (step 304). In one embodiment of the present invention, tagging the instruction involves setting an indicator field included in the instruction. In an alternative embodiment, tagging the instruction involves setting an indicator corresponding to the instruction within processor 100. Tagging logic 130 then passes the instruction to decode unit 106 to continue execution (step 306).

While the tagged instruction executes, processor 100 gathers information about the execution of the instruction and stores the information in registers 126 (step 308). For example, processor 100 may store information such as: the value of the program counter (PC) when the instruction was fetched; the identity of the strand which executed the instruction; the type, privilege, or trap-level of the instruction; the virtual address or effective address of the instruction; the data returned by the instruction; the front-end or completion latency of the instruction; or other values that indicate the performance of the instruction.

If the instruction passes a qualification test (step 310) qualification logic 132 signals instruction-sampling mechanism 128 to record the information stored in registers 126 (step 312). Instruction-sampling mechanism 128 then "resets" tagging logic 130, thereby signaling tagging logic 130 to restart the countdown to the next selected instruction (step 314). Processor 100 then returns to step 300 to feed the next instruction to tagging logic 130.

If the instruction does not pass the qualification test, processor 100 "resets" tagging logic 130 by signaling tagging logic 130 to restart the countdown to the next selected instruction (step 314). Processor 100 then returns to step 300 to feed the next instruction into tagging logic 130. Note that instruction-sampling mechanism 128 does not record the information stored in registers 126 if an instruction does not qualify.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for sampling instructions on a processor that supports speculative execution, comprising:
   selecting an instruction that is received from an instruction fetch unit or a deferred queue, wherein the deferred queue holds deferred instructions which are deferred because of an unresolved data dependency, and wherein selecting the instruction involves tagging the selected instruction by setting an indicator that moves through the processor along with the selected instruction;
   recording information about the selected instruction during execution of the selected instruction; and
   if the selected instruction is deferred to the deferred queue due to an unresolved data dependency, clearing the indicator to prevent subsequent information from being recorded about the selected instruction;
   whereby the recorded information can be used to determine the performance of the processor.

2. The method of claim 1, wherein the deferred instructions are deferred to the deferred queue during an execute-ahead mode, wherein instructions that could not be executed because of an unresolved data dependency were deferred, and wherein other non-deferred instructions were executed in program order.

3. The method of claim 2, wherein the deferred instructions are issued from the deferred queue in a deferred mode, wherein deferred instructions that able to be executed are executed in program order, and wherein other deferred instructions that still cannot be executed because of unresolved data dependencies are deferred again.

4. The method of claim 3, wherein selecting an instruction involves pseudo-randomly selecting an instruction.

5. The method of claim 1, wherein recording the information about the execution of the selected instruction involves recording at least one parameter relating to execution of the selected instruction.

6. The method of claim 1, wherein the method further comprises recording information only for instructions of one or more predetermined types.

7. An apparatus that samples instructions on a processor that supports speculative execution, comprising:

the processor;

an instruction fetch unit on the processor;

a deferred queue on the processor, wherein the deferred queue holds deferred instructions which are deferred because of an unresolved data dependency;

an instruction-selection mechanism configured to select an instruction which is received from one of the instruction fetch unit or the deferred queue;

a tagging mechanism, wherein the tagging mechanism is configured to set an indicator that moves through the processor along with the selected instruction to facilitate recording information about the instruction during execution of the selected instruction; and wherein the processor is configured to remove the indicator if the selected instruction is deferred to the deferred queue; and a recording mechanism configured to record information about the selected instruction during execution of the instruction.

8. The apparatus of claim 7, wherein the apparatus further comprises a pseudo-random number generating mechanism, which generates a pseudo-random number that the instruction-selection mechanism uses to initialize a countdown timer for selecting an instruction.

9. The apparatus of claim 8, wherein the apparatus further comprises an instruction-sampling mechanism, wherein the instruction-sampling mechanism stores the recorded information about the execution of the selected instruction.

10. The apparatus of claim 7, wherein the deferred instructions are deferred to the deferred queue during an execute-ahead mode, wherein instructions that could not be executed because of an unresolved data dependency were deferred, and wherein other non-deferred instructions were executed in program order.

11. The apparatus of claim 10, wherein the deferred instructions are issued from the deferred queue in a deferred mode, wherein deferred instructions that able to be executed are executed in program order, and wherein other deferred instructions that still cannot be executed because of unresolved data dependencies are deferred again.

12. A computer system for sampling instructions on a processor that supports speculative execution, comprising:
the processor;
a memory coupled to the processor;
an execution mechanism on the processor;
an instruction fetch unit on the processor;
a deferred queue on the processor, wherein the deferred queue holds deferred instructions which are deferred because of an unresolved data dependency;
an instruction-selection mechanism configured to select an instruction which is received from one of the instruction fetch unit or the deferred queue;
a tagging mechanism, wherein the tagging mechanism sets an indicator that moves through the processor along with the selected instruction to facilitate recording information about the instruction during execution of the selected instruction;
wherein the processor is configured to remove the indicator if the selected instruction is deferred to the deferred queue; and
a recording mechanism configured to record information about the selected instruction during execution of the instruction.

13. The computer system of claim 12, wherein the apparatus further comprises a pseudo-random number generating mechanism, which generates a pseudo-random number that the instruction-selection mechanism uses to initialize a countdown timer for selecting an instruction.

14. The computer system of claim 13, wherein the apparatus further comprises an instruction-sampling mechanism, wherein the instruction-sampling mechanism stores the recorded information about the execution of the selected instruction.

15. The computer system of claim 12, wherein the deferred instructions are deferred to the deferred queue during an execute-ahead mode, wherein instructions that could not be executed because of an unresolved data dependency were deferred, and wherein other non-deferred instructions were executed in program order.

16. The computer system of claim 15, wherein the deferred instructions are issued from the deferred queue in a deferred mode, wherein deferred instructions that able to be executed are executed in program order, and wherein other deferred instructions that still cannot be executed because of unresolved data dependencies are deferred again.

17. A method for sampling instructions on a processor that supports speculative execution, comprising:
selecting an instruction that is received from an instruction fetch unit or a deferred queue, wherein the deferred queue holds deferred instructions which are deferred because of an unresolved data dependency;
wherein selecting the instruction involves tagging the selected instruction by setting an indicator that moves through the processor along with the selected instruction; and
if the instruction has an unresolved data dependency, deferring the instruction to the deferred queue, wherein deferring the selected instruction to the deferred queue involves:
copying the deferred selected instruction to the deferred queue, continuing execution for the deferred selected instruction to record information about the execution of the deferred selected instruction, and
discarding the result from the selected instruction; and
recording information about the selected instruction during execution of the selected instruction;
whereby the recorded information can be used to determine the performance of the processor.

* * * * *